(12) United States Patent
Virkar (10) Patent No.: US 8,168,561 B2
(45) Date of Patent: May 1, 2012

(54) CORE SHELL CATALYST

(75) Inventor: Anil V. Virkar, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 12/533,345

(22) Filed: Jul. 31, 2009

(65) Prior Publication Data

US 2010/0062929 A1     Mar. 11, 2010

Related U.S. Application Data

(60) Provisional application No. 61/085,185, filed on Jul. 31, 2008.

(51) Int. Cl.
| | | |
|---|---|---|
| B01J 23/00 | (2006.01) | |
| B01J 21/00 | (2006.01) | |
| B01J 20/00 | (2006.01) | |
| B01J 29/00 | (2006.01) | |

(52) U.S. Cl. ........ 502/326; 502/304; 502/324; 502/327; 502/331; 502/332; 502/333; 502/334; 502/335; 502/336; 502/337; 502/338; 502/339; 502/345; 502/355; 502/415; 502/439

(58) Field of Classification Search ................ 502/304, 502/324, 326, 327, 331, 332, 333, 334, 335, 502/336, 337, 338, 339, 345, 355, 415, 439
See application file for complete search history.

(56) References Cited

U.S. PATENT DOCUMENTS

| | | | |
|---|---|---|---|
| 4,077,912 A | 3/1978 | Dolhyj et al. | |
| 4,255,253 A | 3/1981 | Herrington et al. | |
| 5,516,740 A | 5/1996 | Cody et al. | |
| 5,935,889 A | 8/1999 | Murrell et al. | |
| 7,087,191 B2 | 8/2006 | Van Hardeveld et al. | |
| 7,205,255 B2 | 4/2007 | Yamamoto | |
| 7,491,852 B1 | 2/2009 | Chou et al. | |
| 7,846,977 B2 * | 12/2010 | Baijense et al. | 518/700 |
| 2003/0036476 A1 | 2/2003 | Arnold et al. | |
| 2004/0055419 A1 | 3/2004 | Kurihara et al. | |
| 2004/0072061 A1 | 4/2004 | Nakano et al. | |
| 2005/0075240 A1 | 4/2005 | Yamamoto | |
| 2005/0245621 A1 * | 11/2005 | Baijense et al. | 518/716 |
| 2006/0093892 A1 * | 5/2006 | Min et al. | 429/40 |
| 2007/0105005 A1 * | 5/2007 | Tolmachev | 429/44 |
| 2008/0023016 A1 * | 1/2008 | Dellinger et al. | 131/342 |
| 2008/0213154 A1 * | 9/2008 | Kalck et al. | 423/276 |
| 2008/0220296 A1 * | 9/2008 | Eichhorn et al. | 429/17 |

(Continued)

OTHER PUBLICATIONS

Eyal Zussman et al., "Electrospun Polyacrylonitrile/Poly(methyl methacrylate)-Derived Turbostratic Carbon Micro-/Nanotubes", Advanced Materials (2006), p. 348-353.*

(Continued)

Primary Examiner — Cam N. Nguyen
(74) Attorney, Agent, or Firm — Bell & Manning, LLC (57) ABSTRACT

A core-shell catalyst material can include a core and a shell material. Each of the core material and the shell material can have crystal structures and lattice parameters which allow for a substantially coherent core-shell interface. The shell material can include a catalytically active metal. The circumferential stress of the shell material, $\sigma_{\theta\theta}$, at the core-shell interface and at the shell surface, is greater than 0 (tensile) or can be compressive of a lower magnitude than a catalyst made of the shell material alone. The crystal structures of the core material can often be the same as the shell material, although this is not always required.

28 Claims, 6 Drawing Sheets

U.S. PATENT DOCUMENTS

2008/0314798 A1* 12/2008 Stockwell et al. ............ 208/118
2010/0086832 A1* 4/2010 Lopez et al. ................... 429/44
2010/0092841 A1* 4/2010 Lopez et al. ................... 429/44

OTHER PUBLICATIONS

Irene A. Goldthorpe et al., "Synthesis and Strain Relaxation of Ge-Core/Si-Shell Nanowire Arrays", Nano Letters (2008) vol. 8, No. 11, p. 4081-4086.*

V. Schmidt et al., "Morphological instability of misfit-strained core-shell nanowires". Physical Review B 77, 235302 (2008), p. 1-12.*

Robert M Darling et al., "Kinetic Model of Platinum Dissolution in PEMFCs". Journal of Eletrochemical Society, 150 (11) A1523-A1527 (2003).

E.L. Brosha et al., Hexaboride Ceramics as PEMFC Electrode Catalysts Supports, Proton Exchange Membrane Fulel Cells 6, Edited by T. Fuller et al.., ECS.

P. Strasser, "Platinum-rich shell, platinum poor core" Pulbic release date: Oct. 23, 2007, http://www.rsc.org/chemistryworld/News/2007/October/30100701.asp.

W. Zhou et al., "Highly Active Core-Shell Au-Pd Catalyst for Formic Acid Electrooxidation" Electrochemistry Communications, 9(7) 1725-1729 (2007).

J. Zhai et al., "Electrochemical Designing of Au/Pt Core Shell Nanoparticles as nanaostructured Catalyst with Tunalbe Activity for Oxygen Reduction", Electroanalysis 19(4) 506-509 (2007).

J. Zhang et al., "Platinum Monolayer on Non-noble Metal-Noble Metal Core-Shell Nanoperticle Electrocatalysts for O2 Reduction", J. Phys. Chen., B, 109 22701-22704 (2005).

Ye Xu et al., "Adsorption and Dissociation of O2 and Pt-Co and Pt-Fe Alloys" J. Am Chem. Soc., 126 (14)4717-4725 (2004).

R. Srivastava et al., "Efficient Oxygen Reduction Fuel Cell Electrocatalysis on Voltammetrically Dealloyed Pt-Cu-Co Nanoparticles" Angewandte Chemie International Edition, vol. 46, Issue 47, pp. 8988-8991 (2007).

B.D. Cullity, "Elements of X-Ray Diffraction" p. 506-507, Second Edition, Addison-Wesley Publication, Reading, MA (1978).

S.P. Timoshenko and J. N. Goodier. "Theory of Elasticity", p. 452-459, McGraw-Hill, New York, (1970).

I.S. Sokolnikoff, "Mathematical Theory of Elasticity", p. 350-353, McGraw-Hill, New York, (1956).

N. Hahn et al., "Corrosion and oRR Activity of Pt Alloy Electrocatalysts during Voltammetric Pretreatment" Protone Exchange Membrane Fuel Cells 6, Edited by T. Fuller et al., ECS Transactions, vol. 3, No. 1, p. 139-149 (2006).

J.S. Kirkaldy and D. J. Young. "Diffusion in the Condensed State", p. 120, Institute of Metals, London, (1987).

* cited by examiner

CORE SHELL CATALYST

RELATED APPLICATIONS

This application claims the benefit of earlier filed U.S. Provisional Application No. 61/085,185, filed Jul. 31, 2008 and which is incorporated herein by reference.

BACKGROUND OF THE INVENTION

Platinum (Pt) catalysts are often preferred catalysts in many catalytic applications for their generally high activity rate and effectiveness. However, platinum tends to be a very expensive material. A variety of platinum alloys have been used as catalysts. Current approaches to platinum catalyst formation include alloying platinum to form catalyst materials. By alloying platinum, the platinum loading is lowered which also tends to lower raw material costs accordingly. However, alloying can also alter electronic structure and affects catalytic properties. Similar difficulties are generally encountered with other catalyst materials. A relatively large effort has focused on core-shell particles where a less expensive material forms a core and a catalytically active material is formed as a surrounding shell. However, the performance and availability of such materials has been limited.

SUMMARY OF THE INVENTION

A catalyst is presented herein that can reduce cost, and has improved stability. The catalyst is of a core-shell type. The catalyst material can include a core material that has a core crystal structure and a shell material having a shell crystal structure. The shell material can encompass and be attached to the core material at a core-shell interface. The circumferential stress of the shell material, $\sigma_{\theta\theta}$, at the core-shell interface, can be greater than 0 (i.e. tensile) or compressive of a lower magnitude than a catalyst material formed solely of the shell material. Optionally, the core and shell can have the same or different crystal structure as long as the circumferential stress is maintained tensile or compressive of a lower magnitude as discussed.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DESCRIPTION OF THE DRAWINGS

FIG. 1D is a free body diagram of FIG. 1C. If the interface is incoherent, there is greater pressure inside the particle (both the shell and the core) than in a pure Pt particle of the same size. Thus, the chemical potential of Pt is greater in the shell of the core-shell catalyst compared to pure Pt catalyst and thus such core-shell catalysts are expected to degrade faster than pure Pt catalysts.

DETAILED DESCRIPTION

Reference will now be made to exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Definitions

In describing and claiming the present invention, the following terminology will be used in accordance with the definitions set forth below.

It must be noted that, as used in this specification and the appended claims, the singular forms "a," "an," and "the" include plural referents unless the context clearly dictates otherwise. Thus, for example, reference to "a material" includes one or more of such materials and reference to "a reacting step" includes reference to one or more of such steps.

As used herein, "encompassing" refers to an envelope which at least partially surrounds a feature. For example, in some cases the shell may fully encompass the core while in other cases the shell may only encompass the core partially (e.g. as islands). Clearly, the stress profiles discussed herein can be more effective with a complete shell the invention can yet be useful and increased catalytic activity realized even with partial encompassing.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified material, characteristic, element, or agent in a composition. Particularly, elements that are identified as being "substantially free of" are either completely absent from the composition, or are included only in amounts that are small enough so as to have no measurable effect on the composition.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, thicknesses, parameters, volumes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Embodiments of the Invention

A core-shell catalyst material can include a core material and a shell material. The core material has a core crystal structure and the shell material has a shell crystal structure such that a circumferential stress of the shell material, $\sigma_{\theta\theta}$, at the core-shell interface, is greater than 0 (tensile) or compressive of a lower magnitude than a catalyst material formed solely of the shell material.

These stress profiles can be achieved when the shell crystal structure is the same as the core crystal structure. Thus, the type of crystal structure for each of the core and shell is the same. For example, both the core and shell crystal structure can be face-centered cubic (FCC), or body-centered cubic (BCC), or cubic but not one of each crystal type. Alternatively, the crystal structures can be different as long as the lattice parameters are chosen to achieve the desired stress profiles. Furthermore, the crystal lattice parameters can be matched sufficient to satisfy the circumferential stress parameters discussed below. Generally, the lattice parameters for each of the core and shell materials are not the same. The shell material can encompass and be attached to the core material at a core-shell interface. The circumferential stress of the shell material, $\sigma_{\theta\theta}$, at the core-shell interface, can be greater than 0 (i.e. tensile) or compressive of a lower magnitude than a catalyst material formed solely of the shell material. Typically, the shell interface (e.g. outer shell surface) will also have exhibit the tensile or lower compressive stress. The tensile stress exists throughout the shell thickness. However, for influence on catalytic activity, the tensile stress of more importance is the one on the surface of the shell.

The shell material can include any number of materials. Of particular interest are those exhibiting catalytic activity. Often such catalytically active metals include noble metals, although some other materials can be suitable. Non-limiting examples of suitable shell materials include platinum, palladium, rhodium, iridium, cerium, iron, manganese, nickel, copper, cobalt, ruthenium, rhenium, and alloys among themselves or with other materials. In some cases the shell material can consist essentially of such metals. However, certain catalytic reactions can benefit from alloys or composites of such metals. In one specific aspect, the shell material comprises platinum. In another specific aspect, the shell material consists essentially of platinum.

The core material can include any material which is capable of being encompassed to the selected shell material. Further, it is generally desirable that the core material also permit attachment to the shell material. Attachment can be by way of epitaxial lattice matched growth, although non-epitaxial layer can be used as long as the desired stress profiles are achieved. Even with epitaxially grown interface, the matching of crystal lattice can be defect ridden as long as the circumferential stress is maintained as described herein. The core material can be chosen to have the same crystal structure as the shell material. In one aspect, the boundary between shell and core is distinct in that there is substantially no interdiffusion of atoms between the core material and the shell material. In another aspect, the core and shell crystal structures are FCC. In another aspect, the core and shell crystal structures are BCC. In yet another aspect, the core and shell materials can have disparate crystal structures as long as the stress profiles are achieved as described (e.g. tensile stress or less compressive than a catalyst made of the shell material only). In one aspect, the core material comprises a non-noble metal or alloy thereof. In a specific embodiment, the core material can comprise or consist essentially of iron, silver, gold, copper, nickel, palladium, aluminum, cobalt, manganese, and alloys thereof. Therefore, several non-limiting examples of suitable core-shell combinations can include FCC pairs such as Cu—Pt, Ni—Pt, Al—Pt, Ag—Pt, Au—Pt, Co—Pt, and similar combinations with PdPh, Ir, Ce, Rh, Ni, and Co. Non-limiting examples of BCC core-shell pairs can include Cr, Mo, Nb, V, Ta with Fe. Manganese can be paired with other metals (of differing crystal structure) such that stress profiles are achieved.

Due to the circumferential stress of the shell material, $\sigma_{\theta\theta}$, at the core-shell interface and at the shell surface, being greater than 0, that is tensile, (or compressive of a relatively lower magnitude), the core-shell catalyst material can have a reduced degradation rate compared to a catalyst of a same size and shape and composed substantially of the catalytically active metal, while undergoing active catalyst activity. This reduced degradation rate is at least partially a function of the unique circumferential stress maintained in the present invention.

Each of the core and shell material can be homogenous or layered. More particularly, the core-shell material can include a material having a plurality of layers, and thus more than one core and/or more than one shell. In one aspect, the core comprises a plurality of sub-cores. The sub-cores can be composed of any material compatible with the other core material(s). Furthermore, the core and sub-cores can be homogeneous or heterogeneous in composition. Grading the interface can reduce interface dislocations from forming and thus allowing for a greater mismatch and thus higher tensile stress.

The catalyst material can be of any size provided it can function properly as a catalyst. As a general observation, reduced particle sizes offers substantially increased surface area. However, at extremely low particle sizes agglomeration and packing densities can reduce exposed surface areas which effectively decrease the benefit of smaller sizes. With this in mind, as a general guideline, the core can often have a radius from about 0.1 nm to about 1000 nm. In a further aspect, the core can have a radius from about 1 nm to about 25 nm. Similarly, the thickness of the shell can vary. Generally, the thickness can be merely enough to provide catalytic activity. As a general guideline, the shell can be at least one or two atom layers thick (e.g. around 0.5 nm). In one aspect, the shell can have an average thickness from about 0.1 nm to about 10 nm. In a further aspect, the shell can have average thickness from about 0.5 nm to about 3 nm.

Also disclosed herein is a method of making a core-shell catalyst. The method can include selecting a core material having a core material lattice and a shell material having a shell material lattice. The core material lattice and the shell material lattice can be similar enough to form a coherent interface having minimal interface dislocations. The method can further include forming a core of the core material and forming a shell of the shell material that encompasses and is attached to the core such that the shell material is under tensile stress or a compressive stress of a lower magnitude than a catalyst material of common dimensions as the core-shell catalyst and made solely of the shell material.

Although the core can be of any functioning size, in one aspect, the core material can be formed to an average particle size of about 2 nm to about 5 nm. In a particular embodiment, the step of forming a shell includes forming particles of the shell material and then dissolving the particles of the shell material and substantially concurrently depositing the shell material on the core. The particles of the shell material can be of any size, and preferably of a size smaller than the size of the cores. Non-limiting examples of an average particle size for the shell particles are from about 1 nm to about 2 nm.

The core and likewise the shell can be formed by any method known in the art. Non-limiting examples of methods that can be used to form one or more of the core and shell include sputtering, atomization, precipitation, comminution, and combinations thereof. In a particular embodiment, the step of forming the shell can be under substantially epitaxial growth conditions. Generally, the core can be non-porous. In one aspect, the shell can be formed by precipitation or vapor deposition of a salt of the shell material. Non-limiting examples of suitable salts can include platinum(III or IV) chloride, platinum diammine dichloride, hydrogen hexahydroxy platinate, platinum cyanide, palladium chloride, ethylenediamine palladium chloride, palladium bromide, palladium nitrate, palladium sulfate, and the like. Generally, metal salts of those catalytically active metals can be chloride salts, nitrate salts, sulfate salts, bromide salts, organic salts, and the like.

In one alternative, the core is formed on an electrically conducting powder as a particulate support. Electrically conductive powder can provide electrical conductivity to the final core shell catalyst. This can be useful in applications such as fuel cell membranes, although other applications may also benefit. One example of a suitable electrically conducting powder can include carbon black, although certain electronically conducting oxide materials of nanosize particles will also be satisfactory in some applications. An example of such a material is Sr-doped $LaMnO_3$ commonly known as LSM. In accordance with one aspect, the shell can be formed by mixing the electrically conducting powder and core particles in an aqueous solution of a water soluble catalyst material for a time sufficient to precipitate the shell catalyst material from the water soluble catalyst material to form a supported core-shell catalyst which is also electrically conductive. The supported core-shell catalyst can then be optionally washed, filtered and dried to form a dried supported core-shell catalyst powder.

Without being bound to a particular theory, the following discussion presents a theoretically based explanation for some of the aspects of the present invention. Further, although platinum is exemplified, these principles and aspects can be applied to other embodiments described herein.

Dependence of Chemical Potential on Composition

As previously noted, research has been done into two effects of platinum alloy catalysts: lowering platinum loading, and altering electronic structure. However, a third point has generally been overlooked: alloying decreases the chemical potential of Pt and this should influence stability. It is believed that the significance and the importance of the chemical potential as it relates to catalyst stability has not been recognized, studied, or translated into more effective catalyst materials.

The chemical potential of Pt, $\mu_{Pt}$, is related to the thermodynamic activity of Pt, $\alpha_{Pt}$, by $$\mu_{Pt} = \mu_{Pt}^\circ + RT \ln \alpha_{Pt} = \mu_{Pt}^\circ + RT \ln \xi_{Pt} + RT \ln C_{Pt} \qquad (1)$$

where $C_{Pt}$, is molar concentration of Pt in the alloy, $\xi_{Pt}$ is the activity coefficient, and R is the ideal gas constant. In order to lower the thermodynamic activity, it is required that activity coefficient, $\xi_{Pt}$ be as small as possible for a particular set of conditions. This can be achieved using intermetallic compounds such as $Pt_3Co$, $Pt_3Ni$, Pt—Al intermetallics, etc., in which enthalpy of compound formation (or enthalpy of solid solution formation) is negative (exothermic). From chemical thermodynamics, it is known that $$\xi_{Pt} = \exp\left[\frac{\Delta \overline{H}_{Pt}}{RT}\right] \qquad (2)$$

where $\Delta \overline{H}_{Pt}$ = Partial molar enthalpy of dissolving Pt in the alloy. It is thus desired that $\Delta \overline{H}_{Pt} < 0$ (exothermic) so that $\xi_{Pt} < 1$ and $RT \ln \xi_{Pt} < 0$. In order to lower the chemical potential to as low a value as possible, it is desired that $|\Delta \overline{H}_{Pt}|$ be as large as possible with $\Delta \overline{H}_{Pt} < 0$. Thus, the preceding discussion provides a thermodynamic basis for the selection of Pt alloys for improved stability. Alloy catalysts are generally more stable, and this is consistent with the above thermodynamic basis. The objective is to identify intermetallic alloys of Pt having a large (negative) enthalpy of solution or a large negative enthalpy of compound formation that lowers $\xi_{Pt}$.

Dependence of Chemical Potential on Surface Stress

The dependence of chemical potential on pressure is given by (assuming incompressibility)

$$\mu_{Pt} = \mu_{Pt}^\circ + RT \ln \alpha_{Pt} + pV_m \qquad (3)$$

where p is the pressure and $V_m$ is the molar (or partial molar) volume of Pt. The reason for enhanced degradation of nanosize particles is the high pressure generated within the particles, namely, $p = 2\gamma/r$, due to the surface energy effect where $\gamma$ is the surface energy and r is the particle size (radius) (Kelvin/Gibbs-Thompson equation). That is, greater tendency for dissolution of smaller particles is because of the enhanced chemical potential due to the pressure ($p = 2\gamma/r > 0$). In order to enhance the catalyst stability, it is desired that the pressure be as small as possible. The surface energy term naturally leads to a positive pressure (compressive stress). What is desired by the present invention is a reduced pressure, or even a negative pressure or a surface tensile stress. As discussed in what follows, this can be achieved using lattice matched core-shell catalysts with a shell elastically stretched to match the core, in which coherency stress can compensate for the surface energy induced compressive stress. Thus, Pt catalysts can be synthesized comprising a non-noble metal (or alloy) core with a thin Pt or Pt alloy shell such that the shell is in biaxial tension. This same approach can be readily applied to other noble and non-noble catalytically active materials. For example, non-limiting shell material can include platinum, palladium, rhodium, iridium, cerium, iron, manganese, nickel, copper, ruthenium, rhenium, and alloys among themselves or with other materials.

General core-shell catalysts are known. All of the work on core-shell catalysts has been conducted, however, only for lowering the Pt loading in an effort to lower the cost, and/or for possibly improving catalytic activity. The effect of surface stress and stability has not been addressed or manipulated. Based on the methods and materials used compressive stresses appear to exist in many such core-shell materials. In contrast, the newly recognized role of stress on chemical potential is that if the stress is compressive, the chemical potential increases (increased catalyst degradation) and if the stress is tensile, the chemical potential decreases (decreased catalyst degradation).

Core-shell catalysts of this invention are different from those of the prior art physically and are resultantly degradation-resistant. In the present invention, a biaxial tensile stress is achieved by synthesizing core-shell catalysts such that the interface between the core and the shell is coherent—that is well lattice matched shell-core, and core with a higher lattice parameter such that the coherently formed shell will be under tensile stress as atoms of the shell bond with atoms of the underlying core. The effect of core/shell interface on chemical potential and stability is discussed in more detail in what follows.

Core-Shell Catalysts with Incoherent Interfaces

Figure 1A:
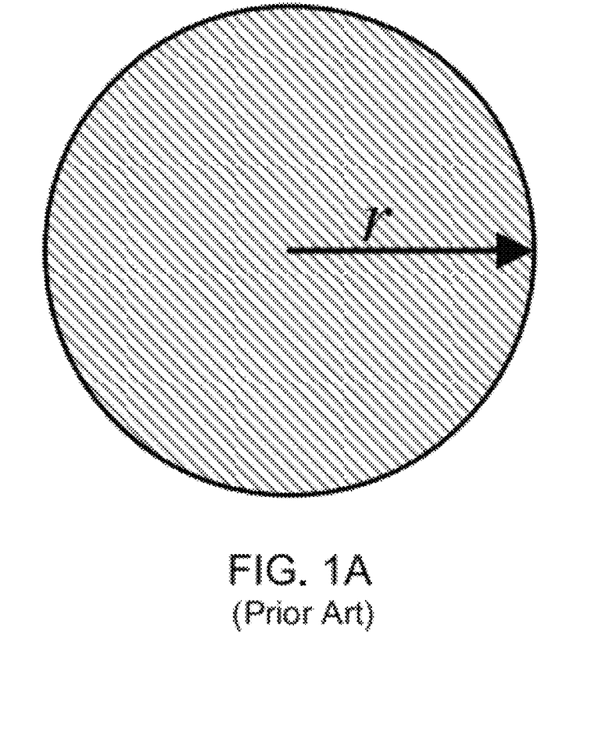
FIG. 1A is a schematic of a Pt particle of radius, r, in accordance with the prior art.
Figure 1B:
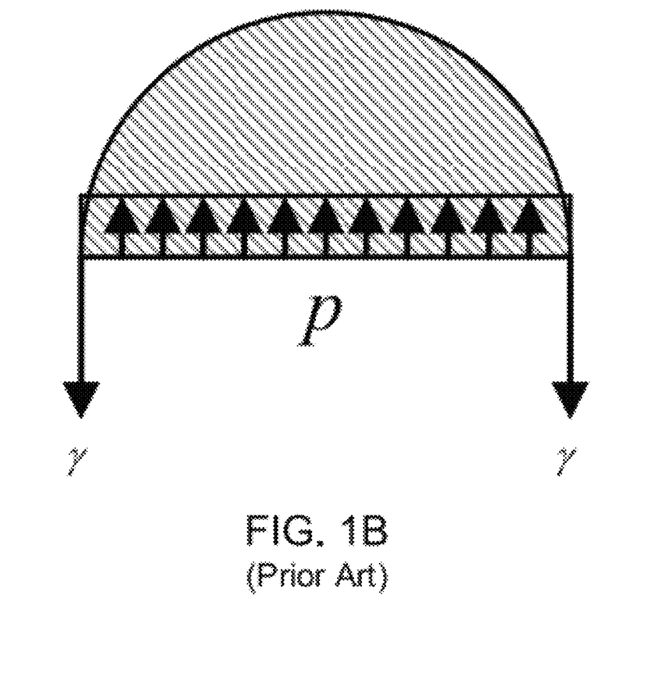
FIG. 1B is a free body diagram of FIG. 1A.
Figure 1C:
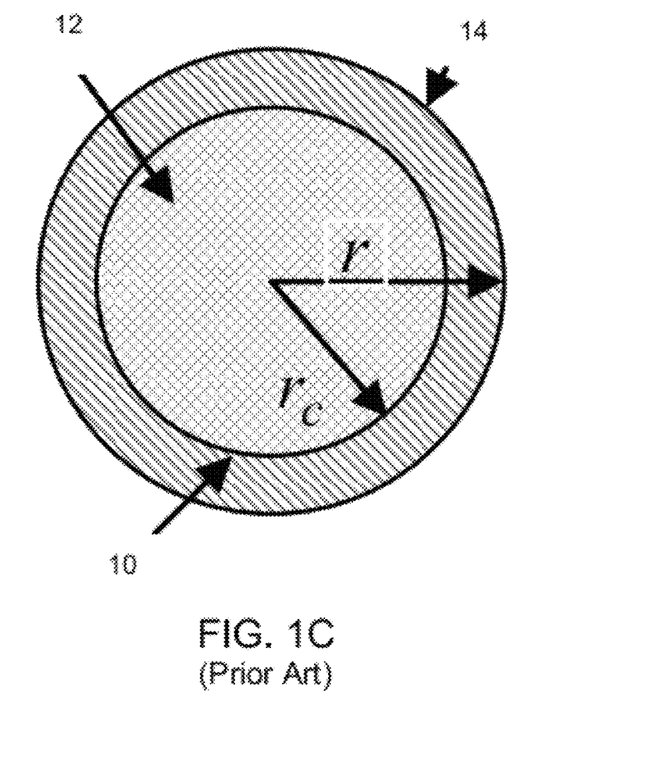
FIG. 1C is a core-Pt shell particle of outer radius 'r' with an incoherent interface common in the prior art.
Figure 1D:
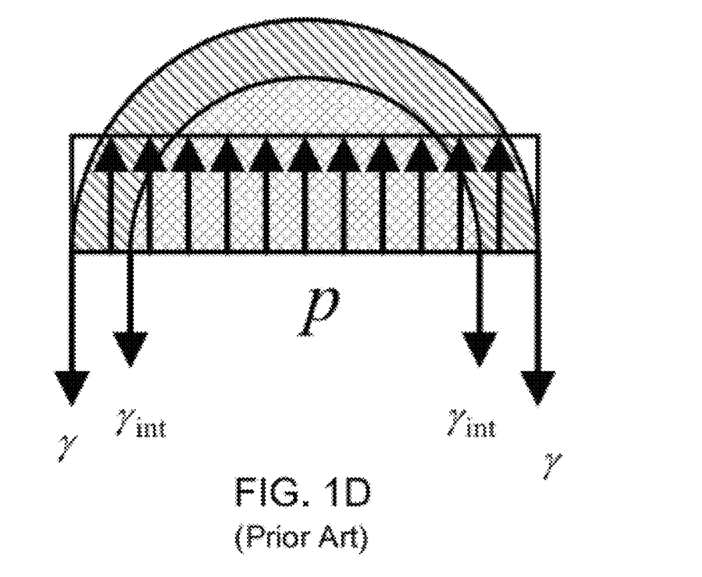

FIG. 1A shows a schematic of a pure Pt catalyst of radius r as found in the prior art. FIG. 1C is a schematic of a core-shell catalyst of the same outer radius, but with a core radius of $r_c$ and an incoherent interface 10 typical of the prior art. The interfacial energy between the core 12 and the shell 14 is given as $\gamma_{int}$. For simplicity, it is assumed that elastic constants of the core and the shell are the same, although this assumption does not affect the broader conclusions. The pressure (due to surface energy) inside a pure Pt particle of radius r is $$p = \frac{2\gamma}{r}.$$

The pressure inside a core-shell catalyst particle, on the other hand, is given by $$p = \frac{2\gamma}{r} + \frac{2\gamma_{int} r_c}{r^2} \quad (4)$$

This equation is analogous to that describing pressure inside a soap bubble (two surfaces) as compared to that in a liquid droplet (one surface). Thus, pressure in the Pt shell of a core-shell catalyst with an incoherent interface is higher than in a pure Pt particle of the same size and the chemical potential of Pt, $\mu_{Pt}(r)$, is also greater in the shell of the core-shell catalyst than in a pure Pt particle. Therefore, the prediction of this analysis is that such core-shell catalysts will degrade faster if the interface is incoherent. A survey of the literature shows that no attention has been paid to this important aspect. The present analysis shows that such catalysts can be more stable since $\gamma_{int}$ is very small if the interface is coherent. However, whether or not they will be more stable can additionally depend upon the state of stress arising due to differences in atomic sizes (differences in lattice parameters) between the shell and the core. This atomic size and lattice parameter effect is discussed in what follows.

Figure 2A:
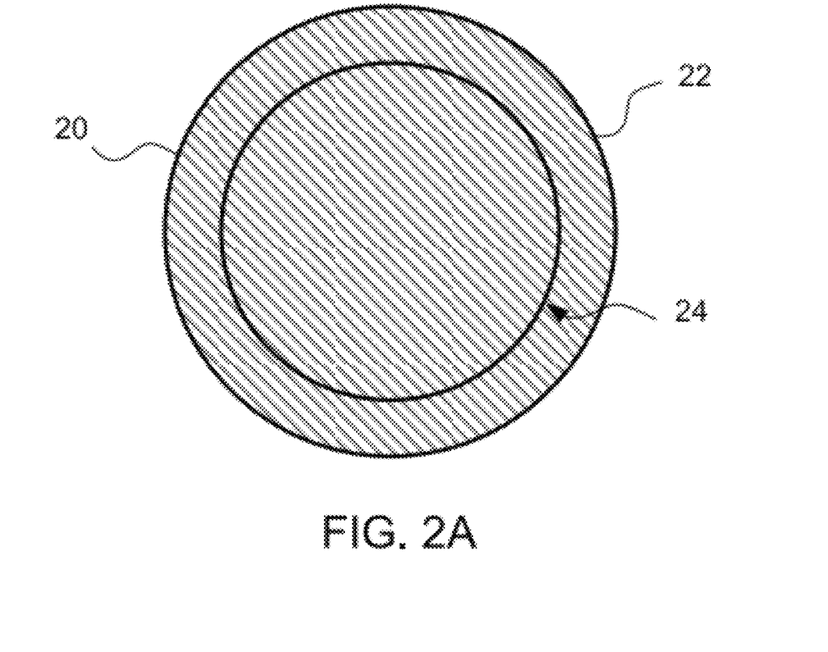
FIG. 2A is a schematic of a core-shell catalyst with a coherent interface in accordance with one embodiment of the present invention. The core-shell catalyst of the invention is different from what has been reported in the literature. For example, the lattice parameter of the core is higher than the shell (Pt), the interface is coherent (lattice planes matched) so that the surface layers are under a coherency tensile stress (with balancing compressive stresses in the core). The net stress in the shell is either tensile or compressive but of a lower magnitude than both pure Pt catalysts and core-shell catalysts with an incoherent interface.
Figure 2B:
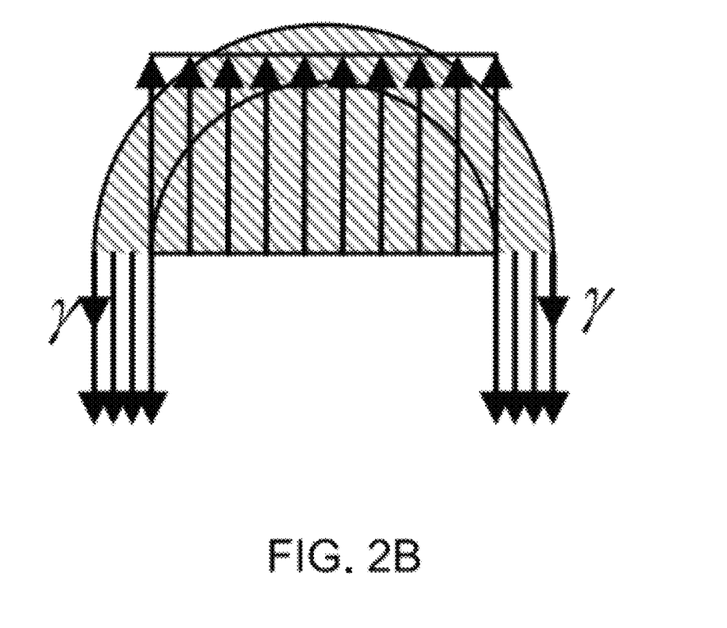
FIG. 2B is a free body diagram of FIG. 2A showing tensile stress in the shell and compressive stress in the core.

Core-Shell Catalysts with Coherent Interface and with Surface in Biaxial Tension FIG. 2A shows a schematic of a core-shell catalyst having a core 20 and a shell 22 with a coherent interface 24 and FIG. 2B the corresponding biaxial tension in the shell. Pt exhibits FCC structure (A1). Other metals belonging to the same crystal structure include Al, Ag, Au, Cu, Ni, Pd, etc. The lattice parameters of these metals are: $l_{Pt}$—0.3924 nm, $l_{Al}$—0.40497 nm, $l_{Ag}$—0.40863 nm, $l_{Au}$—0.40786, $l_{Cu}$—0.36148 nm, $l_{Ni}$—0.35239 nm, $l_{Pd}$—0.38908 nm. That is, $l_{Ag} > l_{Au} > l_{Al} > l_{Pt} > l_{Pd} > l_{Cu} > l_{Ni}$. The core-shell catalyst includes a core of a metal or an alloy of the same crystal structure as Pt but with a higher lattice parameter. Thus, if the core-shell interface is coherent (lattice planes contiguous across the core-shell interface with no or substantially no interface dislocations), the shell is 'stretched' to match the core (and concurrently the core is compressed). This creates a biaxial tensile stress in the shell and a balancing compressive stress in the core as illustrated in FIG. 2B. The stress system in polar coordinates is given by $\sigma_{rr}$ (radial stress) and $\sigma_{\theta\theta}$ and $\sigma_{\phi\phi}$ (circumferential stresses), with $\sigma_{\theta\theta}=\sigma_{\phi\phi}$. Also, at the surface $\sigma_{rr}=0$ since no normal stress exists at the free surface. Thus, the pressure due to coherency strains in the shell (at the surface) is given by:

$$p = -\frac{2\sigma_{\theta\theta}}{3} \quad (5)$$

If $\sigma_{\theta\theta} > 0$ (tensile stress), the pressure due to coherency strains is negative, the desired situation. The net pressure in the shell is given by $$p(r) = \left(\frac{2\gamma}{r} - \frac{2\sigma_{\theta\theta}}{3}\right) \quad (6)$$

And the corresponding chemical potential of Pt in the shell is given by $$\mu_{Pt}(r) = \mu_{Pt}^o + \left(\frac{2\gamma}{r} - \frac{2\sigma_{\theta\theta}}{3}\right)V_m \quad (7)$$

which reflects a lowering of the chemical potential of Pt due to a coherency tensile stress (compare this to equation (2)), thus the lowering of Pt ion concentration in the medium (aqueous liquid/ionomer) and also lowering of the catalyst degradation kinetics.

If the surface regions are under a biaxial compression, the chemical potential of Pt will increase, leading to high Pt ion concentration and thus faster catalyst degradation. Thus, Al, Ag, Au as the core will place Pt shell in tension (or reduced compression) and increase catalyst stability (suppress degradation) of such a core-shell catalyst with respect to pure Pt catalysts, while Cu, Ni, Pd as the core will place a Pt shell in increased compression and thus decrease catalyst stability (enhance degradation) with respect to pure Pt catalysts. Indeed, Pt—Cu catalysts do degrade rapidly. While Al is an ideal material for the core because of higher lattice parameter and low cost, its synthesis in a nanosize form without surface oxidation can prove problematic. From the standpoint of lattice parameter, cost, stability against oxidation and ease of fabrication, of particular interest in one aspect, is Ag (or alloys of Ag), although other materials can also be used (including Au). Also, the core can be made of alloys of these elements to tailor the lattice parameter, which should be as large as possible to ensure as large a negative pressure (tension) in the shell as possible, while still ensuring a coherent interface. If the lattice mismatch is too large, interface dislocations may form, which is undesirable. Thus, the lattice mismatch should be as large as possible while still maintaining a coherent interface. As a general guideline, the lattice mismatch can be up to about 10% although this can vary depending on the particular dimensions and combination of materials.

Pt Ion Concentration in the Medium: Effect of Electric Potential and Stress

It is assumed here that Pt ions in the medium (liquid/ionomer) predominantly exist in +2 state, although the logic remains the same for higher valence state, +4. Electrochemical potential of $Pt^{2+}$ in a Pt catalyst particle (or Pt shell) is given by $$\tilde{\mu}_{Pt^{2+}}^E(r) = \mu_{Pt^{2+}}^o + 2p(r)V_m + 2F\phi^E \quad (8)$$

where $\mu_{Pt^{2+}}^o$=chemical potential of $Pt^{2+}$ in a pure Pt metal, p(r)=pressure in the near surface regions (which can be negative in core-shell catalysts with surface tensile stresses), and $\phi^E$=Electric potential at the particle (assumed to be the same as the supporting carbon because of the excellent electrical conductivity of catalyst/carbon). The electrochemical potential of $Pt^{2+}$ in the liquid/ionomer is given by $$\tilde{\mu}_{Pt^{2+}}^L = \mu_{Pt^{2+}}^{oL} + RT \ln C + 2F\phi^L \quad (9)$$

where $\mu_{Pt^{2+}}^{oL}$=standard state chemical potential of $Pt^{2+}$ ions in the liquid/ionomer, C=concentration of $Pt^{2+}$ in the liquid/ionomer, and $\phi^L$=electric potential in the liquid/ionomer. The average $Pt^{2+}$ ion concentration in the medium (liquid/ionomer) is given by $$C(\bar{r}) = \exp\left[\frac{\mu_{Pt^{2+}}^o - \mu_{Pt^{2+}}^{oL}}{RT}\right] \exp\left[\frac{2F(\phi^E - \phi^L)}{RT}\right] \exp\left[\frac{2p(\bar{r})V_m}{RT}\right] \quad (10)$$

$$= A \exp\left[\frac{2F(\phi^E - \phi^L)}{RT}\right] \exp\left[\frac{2p(\bar{r})V_m}{RT}\right]$$

where A=the pre-exponential factor and $\bar{r}$=Average particle radius. The factor $$\exp\left[\frac{2p(\bar{r})V_m}{RT}\right]$$

determines the effect of surface stress (including the surface energy, $\gamma$, the interfacial energy, $\gamma_{int}$, and the coherency stress, compressive or tensile depending upon lattice mismatch) on $Pt^{2+}$ ion concentration, and thus on degradation kinetics. Thus, Pt shell-Ag core catalysts are generally more stable than pure Pt catalysts, while Pt-shell-Cu-core catalysts to be less stable than pure Pt catalysts. Equation (10) also describes the effect of electrode potential. A nonzero, $(\phi^E - \phi^L)$ exists between the electrode (cathode) and the medium with $(\phi^E - \phi^L) > 0$ at the cathode. Some features of equation (10) are similar to the numerical results given by Darling and Meyers (*Kinetic Model of Platinum Dissolution in PEMFCs*, Journal of The Electrochemical Society, 150 (11), pp. A1523-A1527 (2003) which is incorporated herein by reference). Equation (10) can be compared with Darling and Meyers which describes $Pt^{2+}$ ion concentration as a function of electric potential measured with respect to the standard hydrogen electrode (SHE). The slope of the experimental data given in Darling and Meyers corresponding to 176° C. (experimental data in the paper by Darling and Meyers is on Pt dissolution in phosphoric acid) is measured as (semi log scale - vertical scale as natural log) ~43.3. The calculations of Darling and Meyers give a slope of ~52.3. According to the above equation (10), the slope is estimated as ~51.7. Indeed, the estimates of the slopes given by equation (10) and the numerical results of Darling and Meyers are in excellent agreement. At open circuit, the $\phi^E$ is high, which would increase $(\phi^E - \phi^L)$, increase $C(\bar{r})$ and thus increase catalyst degradation kinetics (by all three mechanisms - agglomeration/sintering, Ostwald ripening, and precipitation within the membrane). It is well known that cathode degradation is faster at OCV, which is in accord with the above-described role of Pt ion concentration and the analysis presented here.

Synthesis of Core-Shell Catalysts with Coherent Interfaces and Shell in Biaxial Tension The materials selected for the core can be any that are capable of producing a coherent interface between the core and shell. In one embodiment, core materials will be or include Ag and Au, although other materials such as those listed previously, can also be used. One objective is to synthesize core-shell catalysts in the few nm size range with coherent interfaces. First, the core can be deposited followed by deposition of the shell. However, to ensure core particles are uniformly coated with the shell, a third step can be introduced. The procedure is described in what follows assuming the core to be Ag.

A salt of Ag, e.g. $AgNO_3$, can be dissolved in water in a required concentration. To this, Vulcan XC-72 carbon with a specific surface area of 250 $m^2/g$ can be added with some ethylene glycol. $NH_4OH$ can be added to this mixture drop by drop until all $AgNO_3$ has reacted. The beaker and its content can be sonicated, heated in a microwave oven, washed and filtered. Subsequently, the mixture can be heated in a furnace to about 200° C. in an inert atmosphere. This leads to formation of nanosize Ag particles. The desired particle size in this example is between about 3 and about 5 nm. The next step includes forming very small Pt particles. For this step the following procedure can be used.

The carbon powder with Ag core particles can be mixed with a dilute solution of $H_2PtCl_6 \cdot 6H_2O$ and ethylene glycol. To this mixture, KOH solution can be added drop by drop. The mixture can be sonicated and heated in a microwave oven. The whole mixture can be filtered, washed and heated to 100° C. overnight in a vacuum oven. This can lead to the formation of Pt nanosize particles, in addition to some deposition of Pt on Ag particles. The size of Pt particles can be about 1 nm to about 2 nm, although other sizes can be formed depending on the concentrations and times involved. It is the expectation that the Pt particles will generally be much smaller than Ag particles, the significance of which is discussed in what follows for the formation of core/shell catalyst particles.

The final step in the formation of the core/shell structure is the introduction of an aqueous Pt-salt solution. For this, an aqueous solution of a Pt salt can be made, to which carbon powder containing Ag and Pt nanosize particles can be added to form a paste. The paste can be heated to ~80-90° C. (while covering to make sure water does not evaporate out). In this process, it is expected that Pt particles can dissolve in the liquid (containing Pt ions in solution) and transport and deposit on Ag particles. The two parallel processes are: (a) dissolution of smaller Pt particles and their deposition on Ag, and (b) dissolution of Ag particles. However, even if the latter process occurs to some extent, this can be accompanied by the deposition of Pt by the displacement reaction. The net effect of either of the reactions is to coat the particles of Ag with Pt. The powder can then be washed to remove all of the salt (and will be collected since it contains Pt salt). The washed powder can be dried and heated to about 200° C. for a few minutes. The treatment at 200° C. may not be necessary since it is possible that a strong coherent interface can form at room temperature itself. It is expected that this can lead to the formation of a strong, coherent interface between Pt (shell) and the core (Ag) without significant interdiffusion. In this manner, core (Ag)-shell (Pt) particles with coherent interfaces can be formed. The as-synthesized core-shell catalysts can be examined by XRD and TEM. If the interface between core and shell is coherent, the XRD peaks will not be separate for the two materials, but will be broader than Scherrer formula would indicate (due to stresses). High resolution TEM can also be used to determine the nature of interfaces. Particle size and size distribution can be measured.

Typical cathode catalysts in PEMFC contain nanosize Pt or Pt-alloy particles supported on high surface area carbon (C). Loss of cathode activity occurs by at least four mechanisms: (a) particle detachment from carbon support (enhanced by carbon oxidation), (b) agglomeration/sintering, (c) Ostwald ripening, and (d) Pt dissolution at cathode and precipitation within the membrane.

Both Ostwald ripening and Pt precipitation in the membrane depend on Pt ion concentration (typically $Pt^{2+}$) in a cathode environment (aqueous liquid and/or ionomer). Recent work has shown that sintering of agglomerated particles also depends on $Pt^{2+}$ concentration. In Ostwald ripening, mechanism involves coupled transport of $Pt^{2+}$ ions through aqueous/ionomer medium and electrons through carbon support. In agglomeration/sintering, the mechanism involves coupled transport of $Pt^2$ through aqueous/ionomer medium and electron transport through direct particle contact. In mechanism (d), precipitation of Pt occurs by a reaction of $Pt^{2+}$ and $H_2$. That is, three of the mechanisms, namely, agglomeration/sintering, Ostwald ripening and precipitation of Pt within the membrane all depend upon $Pt^{2+}$ ion concentration. All factors which increase $Pt^{2+}$ concentration can increase degradation kinetics, and strategy for suppressing degradation kinetics can be based on suppressing $Pt^{2+}$ ion concentration.

Many factors determine $Pt^{2+}$ concentration, some materials related and some related to operating conditions. Prior published work shows that $Pt^2$ concentration in cathode environment increases with increasing cathode potential. Indeed, greater degradation of cathode at higher operating voltages has been documented. The present invention addresses fundamental materials-related properties which determine $Pt^{2+}$ concentration. The materials-related factors which dictate $Pt^{2+}$ concentration include thermodynamics of alloy systems (Pt alloy catalysts) and magnitude of surface stress. All factors which increase chemical potential of Pt catalyst will increase $Pt^{2+}$ concentration in aqueous/ionomer medium, and thus can increase degradation kinetics. From alloy thermodynamics, the fundamental thermodynamic parameter of interest is the partial molar enthalpy of Pt alloy formation, namely $\Delta \bar{H}_{Pt}$. The $\Delta \bar{H}_{Pt}$ should be negative ($\Delta \bar{H}_{Pt}<0$) and its magnitude should be as large as possible to lower Pt chemical potential. The role of stress is also of profound significance. First, a greater tendency for growth of smaller particles (to form larger particles) is the surface energy effect (Kelvin-Thompson equation), which essentially is effect of pressure on chemical potential. The greater the magnitude of surface compression, the greater the chemical potential, the greater is the degradation kinetics.

In pure Pt catalysts, only particle size determines this stress. However, in core-shell catalysts comprising Pt shell and an alloy or non-noble metal core, additional coherency stresses exist. By suitable choices of lattice parameters and interfacial structure, the chemical potential can be reduced thereby reducing $Pt^{2+}$ concentration and thus reducing degradation kinetics. The present invention falls in the following areas: (i) Establishment of $Pt^2$ concentration and temperature effects on the kinetics of pure Pt, Pt alloy, and core-shell catalysts; and (ii) synthesis of core-shell catalysts with tailored surface stress to lower the chemical potential and increase stability.

Identification and control of the role of $Pt^{2+}$ concentration in all three modes of degradation can be important. The questions addressed include how $Pt^{2+}$ concentration depends on thermodynamic and structural properties of catalysts and how the parameters influence degradation. The invented methodology is general and applicable to essentially all electrochemical devices which require the use of nanosize materials in electrodes and the presence of aqueous/ionic medium. This phenomenon can be understood and quantified to minimize degradation of all such electrochemical devices.

The catalysts described herein exhibit high catalytic activity, exhibit excellent stability (negligible degradation), and low-cost compared to the state-of-the-art catalysts used in devices such as proton exchange membrane fuel cells (PEMFC) as cathode and anode catalysts in PEMFC for automotive applications as well as stationary applications.

The catalyst is a low-cost catalyst containing a thin shell of a precious metal on a low-cost material nano particle core. The core may be silver or alloys of silver such as with copper. The precious metal may be platinum. The core is about 2 to 5 nm in diameter and may be as large as 10 nm. The shell is about 1 nm thick. Thus, per unit mass of the precious metal, a large surface area is realized leading to high catalytic activity. The invention describes a method of synthesizing core-shell catalysts. The important advantages are high activity, low-cost, and low degradation rate. Applications are numerous. One of the main applications is in PEMFC.

In many electrochemical devices, most notably Proton Exchange Membrane Fuel Cells (PEMFC), precious metals such as platinum (Pt) are used as catalysts for both the cathode and the anode. Platinum is used in either a pure form or as an alloy. Nanosize particles of the catalyst are dispersed on a carbon black powder, which supports the catalyst and also provides a path for the transport of electrons during the operation of the device. The catalyst particles are further surrounded by an aqueous liquid and/or an ionomer. It is known that the particles should be as small as possible (typically 3 to 5 nm in diameter) to achieve adequate electrocatalytic activity. It is known that the higher the specific surface area (in $m^2/g$), the higher is the activity. This relationship has been experimentally verified up to specific surface area as large as ~95 $m^2/g$. Thus, the particle size of pure Pt or Pt-alloy should be about 3 to 5 nm. Also, it is the objective to reduce the total cost, and thus the precious metal loading should be maintained as small as possible. It is generally accepted that the automotive cost targets will be achieved if the loading per electrode is maintained lower than 0.2 mg/cm². The requirement of low loading and at the same time, high activity places significant constraints on the design of the catalyst. Further, it is also known that during the operation of the PEMFC, catalyst growth occurs, thus leading to a loss of activity. Studies have shown that growth of particles by a factor of 4 or 5 can easily occur within 1,000 h; which is far short of 5,500 h requirement for automotive applications. The rate of particle growth is known to be an inverse function of its size. Thus, the smaller the particle, the greater is the kinetics of growth. As the particles grow, the catalytic activity decreases, making the device performance unacceptable.

The present disclosure addresses two important aspects relevant to PEMFC in particular, and other electrochemical devices using precious metal catalysts in general. The present disclosure leads to precious metal-containing catalysts with high activity at reduced precious metal loading than the state-of-the-art catalysts. In addition, the fundamental catalyst design approach of this disclosure should lead to catalysts less prone to growth, and thus less prone to degradation. That is, the present invention overcomes two important barriers to the commercialization of the PEMFC technology faced by the state-of-the-art catalysts. First, these core-shell catalysts allow attainment of a low precious metal loading, thus lowering cost. Second, the catalysts allow attainment of a low degradation rate, necessary for achieving life time targets, specifically the automotive applications target.

The catalyst design of this invention comprises particles, assumed to be spherical for the purposes of discussion although need not be spherical, containing an inert core made of a low cost material, and an outer shell made of the actual catalyst material, which may be a precious metal such as platinum. The outer shell is sufficiently thin, so that it is possible to achieve large surface area per unit mass of the precious metal. At the same time, it is assumed to be sufficiently thick so that as far as catalysis (or electro catalysis) is concerned, the material behaves as if it is bulk material. The thickness of this layer can be on the order of a nanometer (~1 nm). Selection criteria for the core include the ease of forming nanosize powders and crystal lattice matching with the precious metal catalyst. The overall particle size of the core-shell catalyst can be larger (perhaps 5 or 20 nm) compared to that for the pure catalyst particle of 4 to 5 nm for the same total precious metal content. This should additionally lead to a lower degradation rate, since the degradation rate is an inverse function of the particle size.

The present invention also teaches a method for the fabrication of a core-shell catalyst wherein the overall particle size is in the few nanometer range. The method includes three steps: (a) formation of the core particles of a low cost material of a relatively coarse size (~3 to ~10 nm) on a suitable support, such as carbon black, (b) formation of particles of the precious metal on the same support, wherein the particle size of the precious metal is much smaller (~1 to ~2 nm), and (c) introduction of a suitable salt solution which allows for the transport of the precious metal by dissolution/precipitation to deposit on the core particles to form core-shell catalysts. After this treatment, the catalyst is washed to remove the salt solution and is ready for incorporation into a device such as PEMFC. Such a core-shell catalyst will be a highly active, low-cost catalyst with lower tendency for degradation.

Homogeneous Catalyst and Core-Shell Catalyst Particles

Figure 3A:
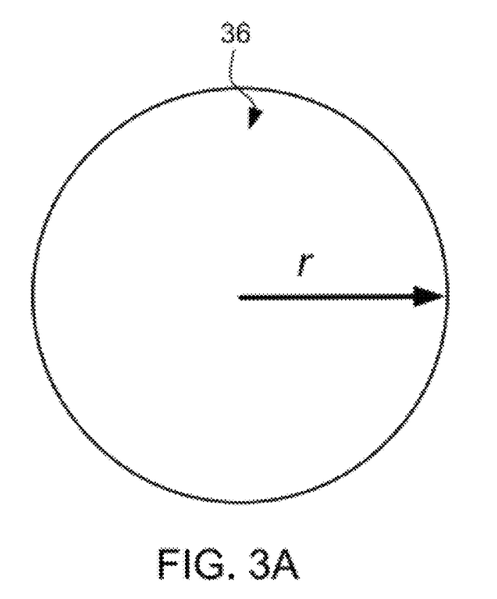
FIG. 3A is a schematic of a particle of radius r of a precious metal.
Figure 3B:
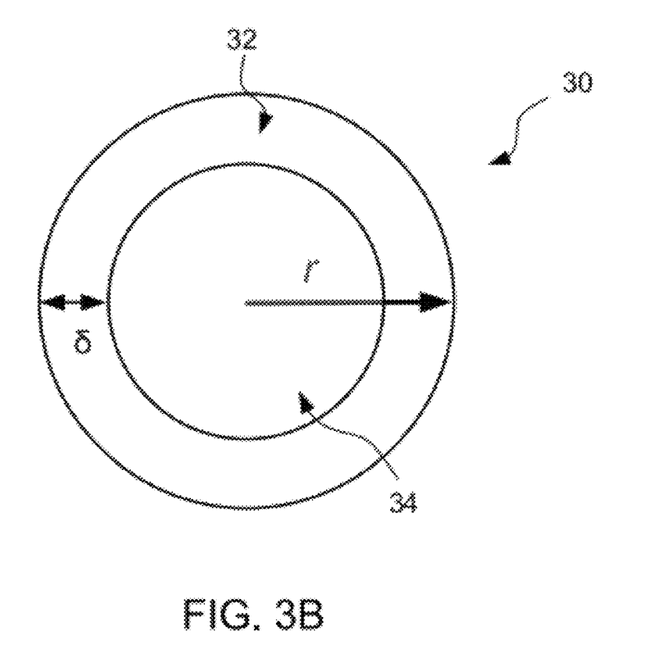
FIG. 3B is a core-shell particle of radius r comprising a low-cost core of radius r–δ and a precious metal shell of thickness δ.
Figure 4:
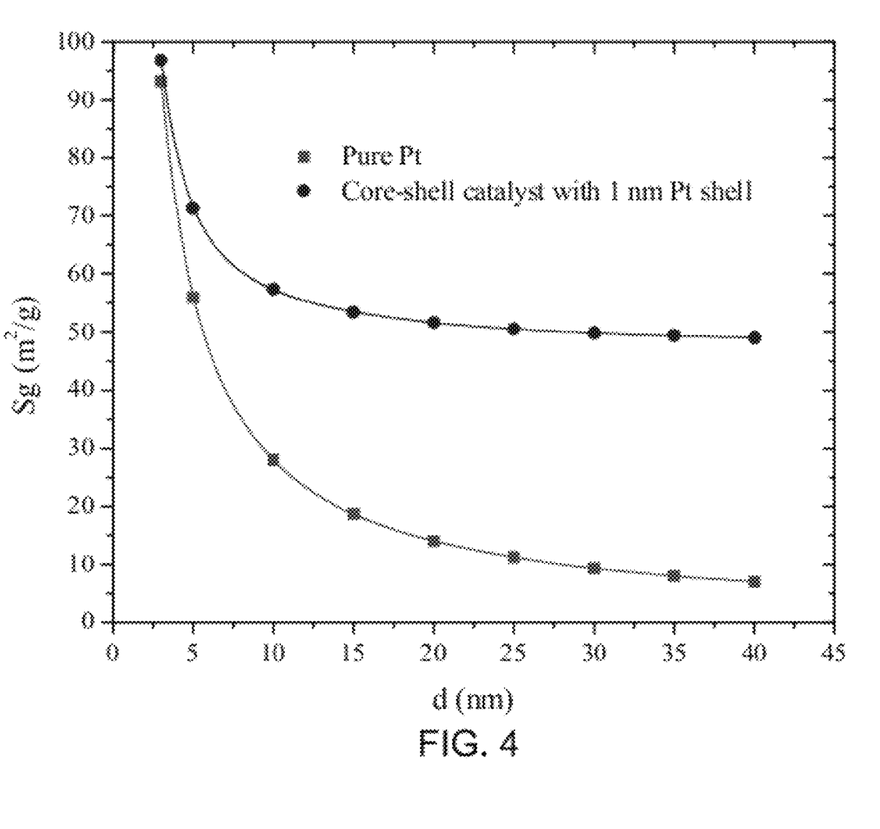
FIG. 4 is a graph of calculated Pt catalyst surface area per gram of Pt for: (a) Pure Pt catalyst, (b) A core/shell catalyst with 1 nm Pt shell. Note the profound effect of this catalyst design, which allows for maintaining high catalyst activity, and suppression of degradation while minimizing usage of Pt.

FIGS. 3A and 3B compare a core-shell catalyst particle 30 (with a precious metal shell 32 and a low-cost core 34), shown in FIG. 3B with a homogeneous precious metal catalyst particle 36 shown in FIG. 3A, both with identical outer radii. Thus, the per particle exposed surface area of the precious metal is $4\pi r^2$. The volumes (and thus masses) of the precious metals, however are different. They are; $4\pi r^3/3$ for the homogeneous precious metal catalyst, and $4\pi(r^3-(r-\delta)^3)/3$ for the precious metal in the core-shell catalyst. Thus, for the same catalyst area, lower precious metal loading is needed using core-shell catalyst. FIG. 4 shows plots of the specific surface area per mass of the precious metal (in m²/g) for a homogeneous precious metal catalyst and a core-shell catalyst with 1 nm shell as a function of the particle diameter, 2r. Note that for a homogeneous catalyst diameter of 40 nm size, the catalyst surface area is only ~6 m²/g, while for core-shell catalyst with 1 nm shell of the same diameter, the surface area is ~50 m²/g. The preceding shows the profound advantage of a core-shell catalyst over the state-of-the-art homogeneous catalyst for the same general activity per unit mass of the precious metal. It is also known that the degradation rate is an inverse function of the catalyst particle radius. This inverse dependence can be either inverse linear or inverse square. If it is inverse square, the kinetics of degradation decreases even faster with increase in particle size. From FIG. 4, for a required total 50 m²/g as the catalyst surface area, the maximum particle size (radius) of the homogeneous catalyst is ~3 nm. The corresponding maximum radius of the core-shell catalyst is ~20 nm. Thus, if the kinetics of catalyst degradation is an inverse linear function of particle size, the homogeneous catalyst will degrade at a rate (20/3) or ~6.67 times faster than that of the core-shell catalyst. If the kinetics exhibits inverse square dependency, the homogeneous catalyst will degrade at a rate (20/3)2 or ~44.4 times faster than that of the core-shell catalyst. This calculation shows that the core-shell catalyst is less prone to degradation, and should exhibit stable behavior, unlike the homogeneous catalyst, which is known to degrade rather fast.

Considerations of the Core: The core material can be an inexpensive metal or an alloy from which it is possible to form nanosize particles. It can generally be of the same crystal structure as the precious metal. The precious metal most commonly used is platinum (Pt), although other metals such as Pd are used in some cases. The crystal structure of Pt is FCC and has a lattice parameter of 3.924 Å. The other FCC metals of interest include Ag (4.0863 Å), Cu (3.6148 Å), Ni (3.5239 Å), Au (4.0786 Å), Pd (3.8908 Å). Both Au and Pd are expensive, but still lower in cost than Pt. An important point to note is that lattice parameters of Cu and Ni are lower than that of Pt, but that of Ag is higher than that of Pt. Thus, by making suitable alloys of Ag with Cu and Ni, it should be possible to match the lattice parameter with that of Pt. The significance is that if lattice matched, the shell can grow as an epitaxial layer, which is desirable from a thermodynamic standpoint. Table I below gives a few possible compositions for the core material. These compositions are given for perfect lattice match between shell (Pt) and core (alloy). By alloying suitably to increase the core lattice parameter, the shell can be placed in tension which should further suppress degradation as discussed earlier.

TABLE I

| FCC Metal | Lattice Parameter (A°) | Possible alloys with lattice Parameter matching to Pt |
|---|---|---|
| Pt | 3.924 | |
| Pd | 3.891 | 83.1% Pd, 16.9% Ag |
| Au | 4.079 | 66.8% Au, 33.2% Cu |
| Cu | 3.615 | |
| Ag | 4.086 | 65.8% Ag, 34.2% Cu; |

Experimental Evidence in Support of Platinum Deposition: One aspect in the synthesis of core-shell catalyst is the dissolution of smaller Pt particles and their deposition on larger particles in a liquid medium containing a water soluble platinum salt. Preliminary evidence in support of this growth mechanism has been obtained. This is described in what follows.

Figure 5A:
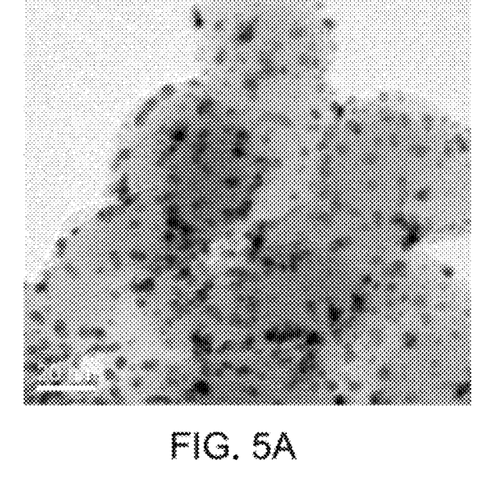
FIG. 5A is a transmission electron micrographs of E-TEK Pt—C catalysts as-received. The Pt particle size is ~3 to 4 nm.
Figure 5B:
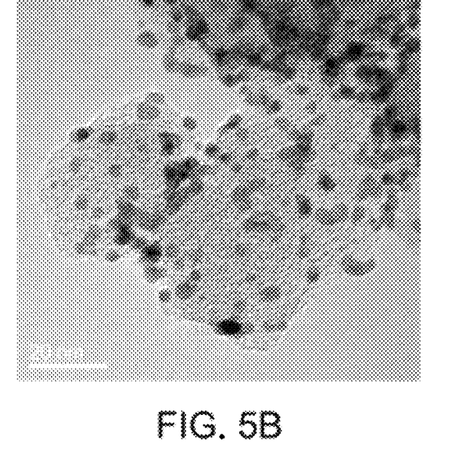
FIG. 5B is a transmission electron micrographs of E-TEK Pt—C catalysts after 3 hours in a dilute $PtCl_4$ (a couple of drops of 0.01 M solution in water)+$HNO_3$ (pH=3) solution, showing the profound effect of platinum ions in solution on growth kinetics, and provides support to synthesis of suitable core-shell catalysts.
Figure 6A:
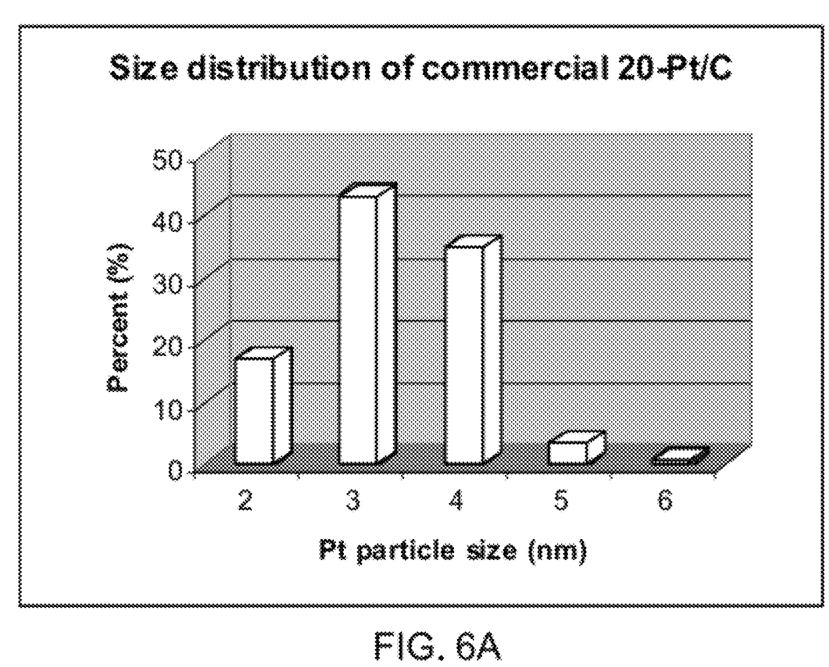
FIG. 6A is a platinum particle size distribution in E-TEK (20% Pt—C) catalyst in the as-received catalyst. The average Pt particle size is ~3.5 nm.
Figure 6B:
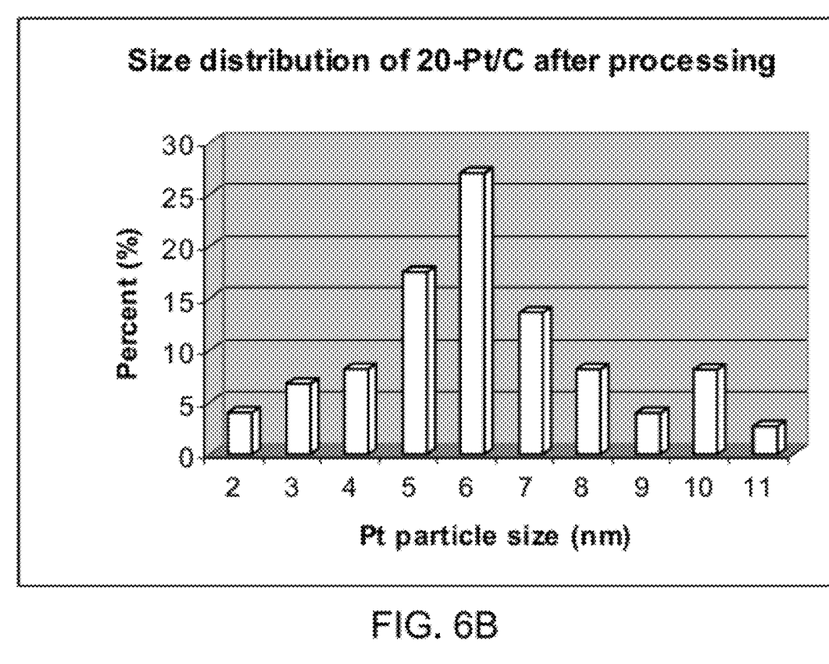
FIG. 6B is a platinum particle size distribution in E-TEK (20% Pt—C) catalyst after 3 hours in a dilute $PtCl_4$ (a couple of drops of 0.01 M solution in water)+$HNO_3$ (pH=3) solution. The average Pt particle size is ~6.5 nm.

Preliminary Experimental Evidence in Support of the Process: Preliminary experimental results, which support the above-described model on the kinetics of Pt catalyst growth are described in what follows. For this experiment, Pt-catalyst supported on carbon was purchased from E-TEK (20% Pt—C). A paste of the sample was made on a glass slide by adding a dilute $PtCl_4$ solution in dilute $HNO_3$. The glass slide was covered to prevent evaporation. After 3 hours, the paste was washed to remove $PtCl_4$, and the sample was dried. XRD patterns were obtained before and after the treatment, which indicated particle growth. Subsequently, the samples were examined using a transmission electron microscope (TEM). FIG. 5A shows that in the as-received material from E-TEK, the Pt catalyst is well dispersed, and supported on carbon. The corresponding measured size distribution is shown FIG. 6A. Note that the majority of the particles are in the 3 to 4 nm size ranges, with negligible number of particles at 5 nm and beyond. FIG. 5B is a TEM image of the sample after a mere 3 hour treatment in a dilute $PtCl_4$ solution. Note that significant particle growth has occurred, with particle size on the order of 4 to 5 nm. FIG. 6B shows the corresponding measured particle size distribution. Note that the majority of the particles are now in the range from 5 to 7 nm, with significant number of particles of size as large as 10 nm, and some even larger. This shows the profound effect of Pt(+4) ion concentration and the presence of a contiguous electronic path provided by the carbon support. This evidence shows one embodiment of the synthesis of low-cost, stable core-shell catalysts.

Therefore, a core-shell catalyst has been presented wherein the core consists of a low-cost inert material and the shell consists of a thin layer of a catalyst material. In one aspect, the core radius is in the range from 0.1 to 1000 nm and the shell thickness is in the range 0.1 nm to 10 nm. In another embodiment, the core radius is in the range from 1 nm to 25 nm and the shell thickness is in the range from 0.5 nm to 3 nm. Non-limiting examples of core materials include silver (Ag), copper (Cu), nickel (Ni), gold (Au), palladium (Pd), aluminum (Al) or alloys thereof, and FCC alloys containing these metals and cobalt (Co) and/or manganese (Mn) and/or iron (Fe). Non-limiting examples of shell materials include platinum (Pt), palladium (Pd), rhodium (Rh), iridium (Ir), or their alloys among themselves or with other metals.

Similarly, a method for forming core-shell catalysts can include the following steps. (a) formation of core particles of a size in the nanometer range supported on an electronic conducting powder such as carbon black; (b) formation of particles of the catalyst material on the same support (the size of the catalyst material is much smaller than the of the core particles); (c) mixing the powder with an aqueous solution containing a water soluble catalyst material salt and maintaining for required period of time; and (d) washing and filtering the powder to remove the catalyst material salt and drying the powder, resulting in a core-shell catalyst supported on an electronic conducting material such as carbon black.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, and manner of operation, assembly, and use may be made without departing from the principles and concepts set forth herein.

What is claimed is:

1. A core-shell catalyst material, comprising:
    a core material having a core crystal structure; and
    a shell material encompassing and attached to the core material at a core-shell interface, said shell material comprising a catalytically active metal, wherein a circumferential stress of the shell material, $\sigma_{\theta\theta}$, in the shell material, is greater than 0 (tensile) or compressive of a lower magnitude than a catalyst material of common dimensions as the core-shell catalyst material formed solely of the shell material.

2. The material of claim 1, wherein the core-shell catalyst material has a reduced degradation time compared to a catalyst of a same size and shape and composed substantially of the catalytically active metal, while undergoing active catalyst activity.

3. The material of claim 1, wherein there is substantially no interdiffusion of atoms between the core material and the shell material and an interface between the shell and the core is coherent.

4. The material of claim 1, wherein the shell material has a shell crystal structure that is the same as the core crystal structure.

5. The material of claim 1, wherein the shell material has a shell crystal structure that is different from the core crystal structure.

6. The material of claim 1, wherein the shell completely encompasses the core.

7. The material of claim 1, wherein the shell material has a shell crystal structure that is the same as the core crystal structure and further wherein, the lattice parameter of the core material is the same or greater than the lattice parameter of the shell material.

8. A core-shell catalyst material, comprising:
    a core material having a core crystal structure; and
    a shell material encompassing and attached to the core material at a core-shell interface, said shell material comprising a catalytically active material,
    wherein a circumferential stress of the shell material, $\sigma_{\theta\theta}$, in the shell material, is greater than 0 (tensile) or compressive of a lower magnitude than a catalyst material of common dimensions as the core-shell catalyst material formed solely of the shell material,
    and further wherein the shell material is selected from the group consisting of platinum, palladium, rhodium, iridium, cerium, iron, manganese, nickel, copper, cobalt, ruthenium, rhenium, and alloys thereof.

9. The material of claim 8, wherein the shell material comprises platinum.

10. The material of claim 8, wherein the shell material has a shell crystal structure that is the same as the core crystal structure, and further wherein, the lattice parameter of the core material is the same or greater than the lattice parameter of the shell material.

11. The material of claim 8, wherein the core material is selected from the group consisting of iron, silver, gold, copper, nickel, palladium, aluminum, cobalt, manganese, and alloys thereof.

12. The material of claim 8, wherein the shell material comprises platinum and the core material is selected from the group consisting of copper, nickel, aluminum, silver, gold, cobalt, palladium, and alloys thereof.

13. The material of claim 8, wherein the shell material comprises platinum and the core material comprises aluminum, silver or gold.

14. A core-shell catalyst material, comprising:
a core material having a core crystal structure; and
a shell material encompassing and attached to the core material at a core-shell interface, said shell material comprising a catalytically active material,
wherein a circumferential stress of the shell material, $\sigma_{\theta\theta}$, in the shell material, is greater than 0 (tensile) or compressive of a lower magnitude than a catalyst material of common dimensions as the core-shell catalyst material formed solely of the shell material,
and further wherein the core material comprises a non-noble metal or alloy thereof.

15. The material of claim 14, wherein the non-noble metal is selected from the group consisting of iron, copper, nickel, aluminum, cobalt, manganese, and alloys thereof.

16. A core-shell catalyst material, comprising:
a core material having a core crystal structure; and
a shell material encompassing and attached to the core material at a core-shell interface, said shell material comprising a catalytically active material,
wherein a circumferential stress of the shell material, $\sigma_{\theta\theta}$, in the shell material, is greater than 0 (tensile) or compressive of a lower magnitude than a catalyst material of common dimensions as the core-shell catalyst material formed solely of the shell material,
and further wherein the shell material has an average thickness from about 0.1 nm to about 10 nm.

17. A method of making a core-shell catalyst material, comprising:
forming a core of a core material, the core material having a core crystal structure; and
forming a shell of a shell material encompassing and attached to the core material at a core-shell interface, said shell material comprising a catalytically active metal, wherein a circumferential stress of the shell material $\sigma_{\theta\theta}$, in the shell material, is greater than 0 (tensile) or compressive of a lower magnitude than a catalyst material of common dimensions as the core-shell catalyst material and made solely of the shell material.

18. The method of claim 17, wherein the core-shell catalyst material is a nanoparticle.

19. The method of claim 17, wherein the step of forming a shell includes forming particles of the shell material and then dissolving the particles of the shell material and substantially concurrently depositing the shell material on the core.

20. The method of claim 19, wherein the particles of the shell material have an average particle size of from about 1 nm to about 2 nm.

21. The method of claim 17, wherein the shell material selected from the group consisting of platinum, palladium, rhodium, iridium, cerium, iron, manganese, nickel, copper, cobalt, ruthenium, rhenium, and alloys thereof.

22. The method of claim 17, wherein the core material comprises a non-noble metal or alloy thereof.

23. The method of claim 17, wherein the core material comprises silver or gold or palladium or alloys thereof.

24. The method of claim 17, wherein the core is formed on an electrically conducting powder, the core having a nanometer particle size.

25. The method of claim 24, wherein the step of forming the shell includes mixing the electrically conducting powder and the core particles in an aqueous solution of a water soluble salt of the catalytically active metal for a time sufficient to precipitate the shell material to form a supported core-shell catalyst material.

26. The method of claim 17, wherein the step of forming the shell is under substantially epitaxial growth conditions.

27. The method of claim 17, wherein the step of forming the shell is performed by precipitation or vapor deposition of a salt of the shell material.

28. The method of claim 17, wherein the shell material has a shell crystal structure that is the same as the core crystal structure and further wherein, the lattice parameter of the core material is the same or greater than the lattice parameter of the shell material.

* * * * *